Sept. 12, 1967 J. R. CONRATH 3,341,830

MAGNETIC MEMORY DRIVE CIRCUITS

Filed May 6, 1964

2 Sheets-Sheet 1

INVENTOR
BY J. R. CONRATH
William H. Kamstra
ATTORNEY

WRITE

READ

3,341,830
MAGNETIC MEMORY DRIVE CIRCUITS

Jules R. Conrath, Salisbury Township, Lehigh County, Pa., assignor to Bell Telephone Laboratories, Incorporated, New York, N.Y., a corporation of New York Filed May 6, 1964, Ser. No. 365,293
8 Claims. (Cl. 340—174)

This invention relates to magnetic memory circuits, and more particularly to circuits for generating access current pulses for such memory circuits. The circuit of this invention is specifically adapted to provide different amplitude write-read currents for magnetic wire memories of the character described, for example, in the patent of W. A. Barrett, Jr., No. 3,067,408, issued Dec. 4, 1962.

In many magnetic memory arrangements access current pulses are generated in a biased core switch comprising a coordinate array of conventional magnetic cores having two sets of coordinate conductors threaded therethrough. In addition, each of the cores is biased in one direction of magnetic saturation by a biasing winding coupled in the same sense to each core of the array. Each of the cores has an output winding also coupled thereto, which latter windings comprise the access drive lines of a multiplane, word-organized memory. Such a biased core switch arrangement is well known in the art and an illustrative such switch in combination with a magnetic wire memory is shown and described, for example, in the copending application of C. F. Ault et al., Ser. No. 311,424, filed Sept. 25, 1963, now Patent No. 3,295,111. When a particular one of the word drive lines is to be energized during an access operation, a conductor of the biased core switch in each of its two sets of coordinates is energized coincidently with half-select current pulses. The core defined by the selected coordinate conductors is switched as a result to generate the drive current pulse in the drive line. In the memory arrangement of the C. F. Ault et al. application, this drive current is required only for reading the stored information, and accordingly drive current pulses of only one amplitude need be generated by the access switch. In other arrangements, the access switch is active during both a write and a read phase and in these phases provide drive currents of different amplitudes. An exemplary such memory circuit is described in the aforecited patent of Barrett.

In the latter memory circuit each information storage address of the multiplane memory comprises a segment of a magnetic wire memory element. This memory element in turn comprises a conductor having a magnetic tape having substantially rectangular hysteresis characteristics helically wound therearound. Such memory elements are well known in the magnetic memory art. In the memory arrangement of Barrett an additional magnetic tape is helically wound around the conductor and in inductive coupling with the first tape. The first tape is formed of a magnetic material having a relatively high coercive force and the second tape has a relatively low coercive force. When a segment of the first tape is set in one direction representative of one binary value, the flux thus established in the segment is completed through the adjoining tape of the low coercive force. Parallel groupings of the tape wound conductors lie in one set of the coordinates of the memory and the parallel drive lines lie in the other set of coordinates. The organization of the memory thus far described differs from other known arrangements in the provision of two coercive force tapes at each address segments.

During a write operation, the write current applied to a selected word drive line by the access core switch need not, within limits, be maintained below a critical value. Selection between the two binary values during writing is accomplished by oppositely poled coincident bit currents applied to the memory element conductors themselves in accordance with the particular values to be written into the selected word row. The write drive current applied to the drive line of the selected word row is at a level so that when aided or opposed, in accordance with the binary values, it is sufficient to switch or leave set the representative flux states in the address segments of the high coercive force tapes of the row. On the other hand, during a read phase the drive line must supply a read pulse to the address segments of a selected word row which is sufficient to switch the flux of the low coercive force tape but which is insufficient to disturb permanently the flux in the high coercive force tape at the same address to insure nondestructive read out. The access switch must thus provide current pulses of two amplitudes for the write and read phases of operation, and it is to this requirement imposed on the access switch that the present invention is directed.

In the normal operation of the biased core switch a selected core is operated upon by three magnetomotive forces; the continuously applied bias maintaining the core in magnetic saturation in one direction and the additive coincident half-select currents tending to switch the core to magnetic saturation in the opposite direction. In the simplest case these forces are equal in magnitude. When the additive half-select currents are coincidently applied to selected coordinate conductors, the bias applied to the core defined thereby will be overcome and a drive current will be induced in the drive line coupled to the core. This drive current approximately follows the net magnetomotive force applied to the core. When the coincident half-select currents are terminated the biasing current again takes over control of the flux state of the core and a current is again induced, although in the opposite direction, in the drive line by the flux return to its original magnetic biased state.

One convenient manner of operating the access switch in order to produce currents of different amplitudes would be to change the values of the bias current for the writing and reading operations. However, a delay will thus be introduced in the access time due to the time required to change the bias current from one value to the other. An additional burden may also be imposed on the bias current generator circuits. An illustrative computation of the time required for such a changeover and the characteristics of the bias source will serve to demonstrate the problems encountered in providing two valued drive currents for a drive line. In one memory arrangement of the character described in the aforecited Barrett patent each of the 4096 words storable therein contains 54 bit addresses. The access core switch array has a one turn bias winding for each of the cores, the winding having a resistance of 1.9 ohms and an estimated inductance of approximately 200 microhenries. Assuming that in the illustrative case, the bias current is varied to achieve the different valued drive currents for the write and read phases, then the bias current was given as 3.6 amperes for the write phase and 1.8 amperes for the read phase. If rapid changes of bias current were not needed, the supply voltage required would be $3.6\times1.9=6.8$ volts and the power dissipation would then be about 25 watts. If the bias current is required to change from 1.8 amperes to 3.6 amperes in a time $t$, then a back voltage as follows would be induced:

$$200\times10^{-6}\times\frac{3.6-1.8}{t}=\frac{360\times10^{-6}}{t}$$

If a value of $t=5$ microseconds is assumed, the back electromotive force is 72 volts. Such a back electromotive force would thus require a bias source of more than ten times the capacity needed if the bias current were not subject to rapid changes. In addition, the 5 microseconds interval required before and after a write operation is not tolerable where access time must be reduced to a minimum. The foregoing computation thus demonstrates the advantages to be grained by maintaining the bias current constant when changing from one drive current amplitude to another during the two operative phases.

One manner in which the bias current may be held constant and yet achieve different amplitude write and read currents will be evident to one skilled in the art. The bias current may be selected at a value such that the additive half-select coincident currents are sufficient for writing in the higher coercive force tape. During the read operation the half-select coincident current pulses may then be reduced to a value below that necessary to disturb the higher coercive force tape and still be sufficient to generate a drive current which will switch the lower coercive force tape. This would work satisfactorily during the positive half-cycle of the induced drive current. However, when the coordinate half-select current pulses applied to the biased core switch are terminated, it will be recalled, the bias again takes over control of the flux state of the selected core. As a result, during the negative half-cycle of the drive current, its magnitude, as determined by the restoring flux swing in the core, is sufficient to destroy information in the interrogated word row.

An object of the present invention is the generation in a biased core switch, of different amplitude output signals while the amplitude of the biasing current is maintained constant.

Another object of this invention is to provide a new and novel access circuit for a magnetic memory having two coercive force magnetic address elements excited responsive to different amplitude drive signals.

It is also an object of this invention to reduce the access time and circuit requirements in magnetic memory arrangements having two coercive force magnetic address elements.

The foregoing and other objects of this invention are realized by means of a novel biased core access switch and its operation in combination with a magnetic wire memory arrangement of the character generally considered hereinbefore. In the biased core switch of this invention a bias of a constant amplitude maintains each of the cores in one direction of magnetic saturation. Selection of a core during the write phase is made in the conventional manner, that is, by applying half-select coincident currents to the coordinate conductors of the switch which define the crosspoint of the selected core. These half-select currents may be of equal amplitude and duration and their sum magnitude is sufficient to generate drive current in the coupled drive line of the switching core which will switch the high coercive force tape of the address segments of a word row. During the read phase, on the other hand, with the bias remaining constant, one of the partial-select currents remains the same in amplitude and duration as during the write phase. The other partial-select current is reduced in amplitude and increased in duration. As a result, the sum of these currents during the duration of the shorter pulse generates in the drive line the necessary smaller current for switching the low coercive force tape of the address segments. When the shorter duration partial-select current is terminated, the bias swings the selected core of the access switch back in the direction of its normal magnetic saturation state. However, the flux swing is less than a full restoration due to the still applied other partial select current pulse. As a result, the value of negative half-cycle of the drive line current is insufficient to cause any permanent change in the information bearing magnetic state of the address segments of the interrogated word row. When the longer partial-select current pulse itself is terminated, a full restoration of the core is effected by the biasing current. However, the small current now generated in the drive line will also be of insufficient magnitude to disturb the information in the address segments.

It is accordingly one feature of this invention that the bias current in a biased core access switch is maintained constant while the amplitude and duration of one of the coincident partial-select current pulses are varied for writing and reading.

The foregoing and other objects and features together with the organization of this invention will be better understood from a consideration of the detailed description of one illustrative embodiment thereof when taken in conjunction with the accompanying drawing in which.

Figures 1, 2:
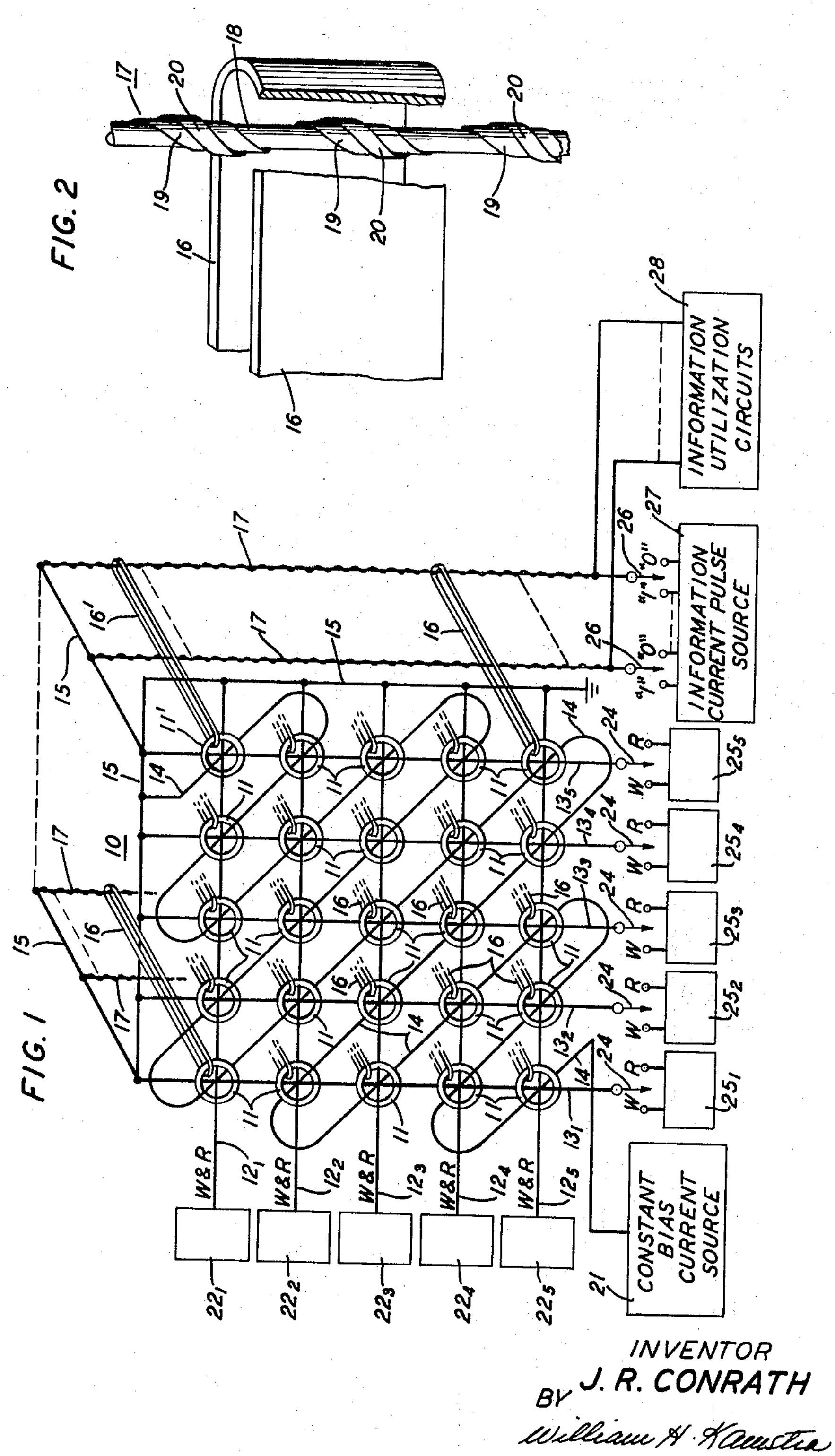
FIG. 1 depicts the organization of an illustrative access core switch according to this invention together with representative memory elements of the memory.
FIG. 2 shows the details of a drive line-memory wire combination as employed in the magnetic memory of FIG. 1, the elements being shown in fragmentary and broken form for purposes of clarity.

A memory organization contemplated in connection with this invention is depicted in FIG. 1 and comprises a biased core switch 10 which in turn comprises a coordinate array of magnetic cores 11. Each of the cores 11 is conventionally of a magnetic material exhibiting substantially rectangular hysteresis characteristics. The rows and columns of cores 11 of the array have threaded therethrough in a manner well known in the art a plurality of *x* and *y* coordinate selection conductors 12 and 13. The crosspoint of each conductor of one plurality and each conductor of the other plurality thus defines a particular address within the switch array. Each of the cores 11 of the switch 10 is also threaded by a biasing conductor 14. One end of each of the conductors 12, 13, and 14 terminates at a ground bus 15.

The switch 10 is functionally associated with a multiplane magnetic memory by means of individual output windings 16 coupled to the cores. The output windings 16, only representative ones of which are fully shown and which are in the form of flat strip drive lines, are parallelly extended into the planes of the memory and are organized so that the windings, or drive lines, 16 of a column of cores define the word rows in a plane of the memory. The corresponding cores of the columns thus define corresponding word rows of the memory planes. Each of the memory planes comprises a parallel arrangement of magnetic wire memory elements 17 of the character described in the aforecited patent of W. A. Barrett, Jr. The specific character of the wire memory elements 17 may be more clearly seen in FIG. 2 where an association of a representative portion of a memory element 17 and a portion of a single drive line 16 is shown. The element 17 comprises an electrical conductor 18 having wound therearound in a helical fashion a first flat magnetic tape 19. A second tape 20 is also wound in the same fashion around the conductor 18 and in inductive coupling with the first tape 19. Each of the tapes 19 and 20 is formed of a magnetic material exhibiting substantially rectangular hysteresis characteristics. However, one of the tapes in the present case, conveniently the tape 19, has a higher coercivity than the other tape 20. Different magnitude magnetomotive forces are thus required to cause a flux switching in each tape. Both of the tapes 19 and 20 are inductively coupled to the conductor 18 and an advantageous manner of achieving the relationships of the two tapes is by winding the second tape directly on the first tape. The flat strip drive line 16 is coupled to the two tapes 19 and 20 by encircling the parallel arrangement of wire memory elements 17 so that each element 17 is passed twice by a drive line 16. Each of the drive lines 16 defines a word row of the memory and, within the word row, defines on the memory element tapes 19 and 20 the bit address segments. To avoid complexity only representative memory planes and, within the planes, only representative memory elements are shown in FIG. 1.

The biasing winding 14 of the access switch 10 is connected at its other end to a constant bias current source 21. Each of the conductors 12 is connected at its other end to an individual current pulse source 22 and each of the conductors 13 has connected thereto at its other end a switch wiper 24. The switch wipers 24 are each settable to one of two terminals, a write terminal W and a read terminal R. For each of the wipers 24 the terminals W and R connect to an individual source of current pulses 25. The current sources 21, 22, and 25 are of a character readily envisioned by one skilled in the art when apprised of the nature of the output currents to be supplied thereby, which currents will be considered in detail hereinafter. Each of the conductors 18 of the memory elements 17 terminates at one end in the ground bus 15 and has connected thereto at its other end a switch wiper 26. The wipers 26 are each settable to one of two terminals, a "1" terminal and a "0" terminal. The latter terminals connect to a source of information current pulses 27. The character of the latter source will become apparent from a consideration of an illustrative operation of the memory arrangement to be described. Each of the conductors 18 also terminates directly, before its connection with a switch wiper 26 at information utilization circuits 28. The latter circuits may comprise any circuits of system with which the memory of FIG. 1 may be adapted for use which is capable of receiving the output signals of the memory to be described.

Figure 3:
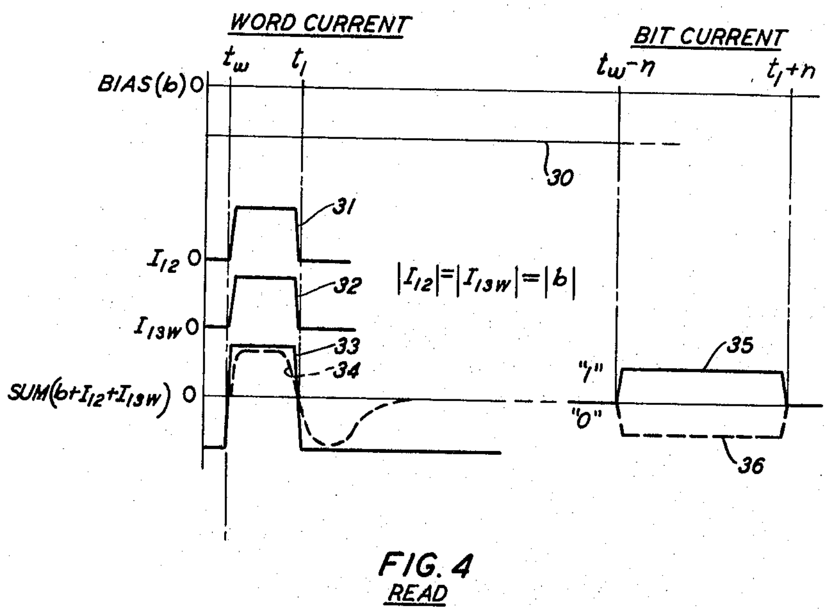
FIG. 3 shows a comparison of the current pulses in idealized form occurring during an illustrative write operation of a memory arrangement according to this invention.
Figure 4:
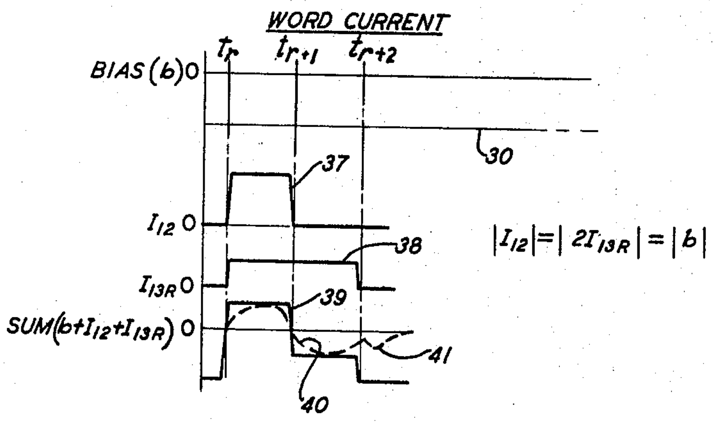
FIG. 4 shows a comparison of the current pulses in idealized form occurring during an illustrative read operation of a memory arrangement according to this invention.

The operative states of the memory arrangement of FIG. 1 will best be understood by reference to FIGS. 3 and 4 where are shown the relationships among the various current pulses generated to accomplish an illustrative write and read operation. In describing an illustrative write and read operation of the memory arrangement of FIG. 1, it will be assumed that the current sources 22, 25, and 27 and the settings of the switch wipers 24 and 26 are controlled to achieve the desired operation in any convenient manner known in the art. Thus it will be understood that the switch arrangements including the wipers 24 and 26 are symbolic only and although such arrangements would in fact achieve an operable circuit, in the practice of this invention the operations of these switches together with that of the current sources 22, 25, and 27 would be controlled by information and clock circuits readily envisioned by one skilled in the information handling art. For purposes of describing an illustrative operation of the memory of FIG. 1, it will further be assumed that access is to be had for writing and reading to the word row defined by core 11' of the access switch 10. This core is in turn defined in the switch 10 by the coordinate conductors $12_1$ and $13_5$. For both writing and reading the current sources $22_1$ and $25_5$ will be rendered active by external circuitry, not comprising a part of the present invention, which provides the aforementioned information and timing control.

During both a writing and reading operation a bias current 30 is continuously applied from the source 21 to maintain each of the cores 11 in the same direction of magnetic saturation. The polarity of the bias 30 is shown in FIGS. 3 and 4 as negative although it will be understood that either polarity may be employed as determined by the biased state desired and the sense of the biasing winding 14. The operative current pulses during a write operation are shown in idealized form in FIG. 3. The currents with which the present invention is concerned are those generated by the biased core switch 10 and are the word currents indicated in FIG. 3. At the time $t_W$ the current source $22_1$ is controlled to provide a positive current pulse 31 applied to the $x$ coordinate conductor $12_1$ as a current $I_{12}$. The pulse 31 has the same absolute value as the bias current $b$. Coincidently with the pulse 31 the current source $25_5$ is controlled to apply to the $y$ coordinate conductor $13_5$ a positive current pulse 32 after the switch wiper 24 of that conductor has been moved to the write terminal W. This current pulse appears in the conductor $13_5$ as a current $I_{13W}$. The current pulse 32 is also equal in absolute value to the bias current $b$. In a well known manner, one of the coincidently applied pulses 31 and 32 just counters the oppositely poled bias current and the other of these pulses then drives the selected core 11' around the knee of its hysteresis loop toward the opposite direction of saturation. The extent of the flux excursion thus caused will determine the amplitude of the current generated in the output winding of the core 11' as is also well known. The sum of the currents 31 and 32 and the bias $b$ are shown by the waveform 33 as originating at the bias reference point. The resulting current generated in the output winding, that is, the drive line 16', coupled to the core 11' is shown by the dashed line waveform 34. The sense of the coupling of the drive line 16' is such that the drive current 34 is also positive. The current 34 continues positive until the half-select current pulses 31 and 32 are terminated at the time $t_1$, which time may occur, for example, 4 microseconds after the time $t_W$. At the time $t_1$ the bias current $b$ again takes over control of the flux state of the core 11' and drives it back to its normal state of magnetic saturation. This restoring flux swing again induces a current in the drive line 16', this time, however, as a negative current. Since the flux excursion back to the normal state is equal to the write switching, the negative half-cycle of the drive current 34 will be equal in amplitude to the positive half-cycle.

The alternating current 34 is thus supplied by the access switch 10 as one of the write current components for writing the information bits in the word row defined by the drive line 16' on the individual wire memory elements 17. The other of the write current components is individually supplied for each of the elements 17 by the current source 27. The latter source is controlled in accordance with external information circuitry also not comprising a part of this invention and accordingly not shown in the drawing, to provide the current pulses which will determine the particular binary values written into the selected word row. The switch wipers 26 are also controlled by this external circuitry to select either the "1" or the "0" terminal in accordance with these binary values. The particular values so determined need not be considered at this point further than is necessary to provide the necessary context for this invention. In a conventional manner during writing a binary "1" may be introduced into any of the address segments defined by the drive line 16' by applying via a switch wiper 26 a positive current pulse 35 to the conductor 18 of a wire memory element 17 coincidently with the generation in the drive line 16' of the alternating current 34. During the positive half-cycle of the latter current pulse, the pulse 35 is added thereto to cause a switching of a high coercive force tape of the address segment of a memory element 17 to represent the storage therein of a binary "1." The low coercive force tape will also be switched by the coincident write pulses; however, the flux state thus induced is temporary. When the write pulses are terminated the flux in the high coercive force tape at the address segment closes through the low coercive force tape to reswitch the flux state in the latter element.

The bit write current 35 is continued for the duration of the word write current 34 and during the negative half-cycle of the latter current these currents are in opposite directions. Thus, they cause no disturbance of the information written into a bit address during the negative half-cycle of the current 34. A binary "0" is written into an address segment of a word row in the same manner as the writing of a binary "1" except that the polarity of the bit current is reversed. This current pulse 36 is shown in FIG. 3 by the dashed line waveform. In this case, the word and bit currents oppose each other during the first half-cycle and any flux switching which occurs in an address segment, occurs during the negative half-cycle when these currents add. However, in the conventional manner, the low coercive force tape of an address segment which is to contain a binary "0" may already be in this flux state as the result of a previous read operation, in which case only negligible flux shuttling would occur. The pulses 35 and 36 may be timed to occur at a time $t_w-n$, or just before the occurrence of the word write current 34, and to terminate at a time $t_1+m$, or just after the termination of the current 34, to insure coincidence during the build-up and decay of the drive current 34.

With binary information values written into the exemplary word row defined by the drive line 16' in the manner described in the foregoing, an illustrative read operation in accordance with this invention may now be considered. For this purpose, the drive line 16' will again be energized by the access switch 10. Particularly, the access core 11' will again be switched to generate the read drive current on the line 16'. As previously mentioned the core 11' has the continuously applied biasing current 30 maintaining it on one direction of magnetic saturation. Now coincident currents must be applied to the defining coordinate conductors $\mathbf{12}_1$ and $\mathbf{13}_5$ of a magnitude sufficient to generate a read drive current in the drive line 16' which alone will cause a flux switching in the address segment low coercive force tapes without the cooperation of bit currents on the conductors 18. This read current on the drive line 16' further must be insufficient in either its positive or negative half-cycle to disturb the information bearing magnetic state of the high coercive force magnetic tapes of the address segments.

The core 11' is selected by the application of the coordinate conductor $\mathbf{12}_1$ at the read time $t_r$ of a positive partial-select current pulse 37. This pulse which is shown in idealized form in FIG. 4, is identical to the current $I_{12}$ applied during the write operation and accordingly the current source 22 is controlled to repeat its operation. Coincidently with the application of the pulse 37 to the conductor $\mathbf{12}_1$, the current source $\mathbf{25}_5$ is controlled to apply to the coordinate conductor $\mathbf{13}_5$, after the switch wiper 24 connected thereto has been moved to the read terminal $r$, a positive current $I_{13r}$ shown in FIG. 3 as the idealized waveform 38. The latter partial-select read current, in the present embodiment, is approximately half the amplitude of the other coincident current pulse 37 and is applied for substantially twice the time duration of the latter current pulse. The additive effect of the coincident pulses 37 and 38 is to cause a flux switching in the selected core 11' of a lesser degree than that caused by the half-select current pulses 31 and 32 during the write operation. The sum of the currents $I_{12}$, $I_{13r}$, and the bias is shown in FIG. 4 by the waveform 39. Since this sum is less than that produced during the write operation, the current generated in the drive line 16' as a result will also be of a smaller amplitude. The amplitude of the pulse 38 when added to that of the pulse 37 and the bias is adjusted so that the current 40 in the drive line 16' is insufficient to cause a permanent flux switching in the high coercive force tapes of the address segments of the memory elements 17 of the interrogated word row but, on the other hand, will be sufficient to switch the low coercive force tapes at those address segments. It may be noted that, contrary to other conventionally interrogated magnetic memory arrangements, the read current 40 on the drive line for a word row is of the same polarity as the write current 34 on the same drive line. This follows from the fact that the write current is employed to write in the high coercive force tape, in which the flux state is in one direction, while the read current is employed to read in the low coercive force tape, in which the flux state is in the opposite direction.

When the low coercive force tapes of the address segments defined by the drive line 16' are interrogated, the flux switching in these segments indicates in a conventional manner, the presence in those bit addresses of binary "1,'s." This flux switching is manifested as output signals appearing in the conductors 18 of the memory elements 17. These output signals are transmitted via the conductors 18 of the memory elements 17 to the information utilization circuits 28. The absence of flux induced signals on the conductors 18 also in the conventional manner manifests the storage in the interrogated addresses of binary "0's." During the positive half-cycle of the drive current 40 the drive current is thus maintained insufficient to cause a flux switching in the high coercive force tapes. The latter tapes must also be maintained undisturbed during the negative half-cycle when the biasing current 30 is again able to affect the flux state of the core 11'. This is achieved in accordance with the principles of this invention by continuing the concident partial-select pulse 38 after the other partial-select pulse 37 has been terminated. Thus, at the time $t_{r+1}$, which may occur 4 microseconds after the initiation of the pulses 37 and 38 at the time $t_r$, the pulse 37 is terminated. As a result, the bias current 30 now causes a restoration of the flux state of the core 11' toward its original, pre-interrogated state. However, the opposing current pulse 38 is still being applied via the coordinate conductor $\mathbf{13}_5$. Accordingly, the the core 11' cannot be restored completely to its original fully saturated flux state. The current 40 generated in the drive line 16' is thus maintained, during the negative half-cycle, at a level insufficient to cause a flux change in the high coercive force tapes of the interrogated word row. At any time after the decay of the drive line current 40 the partial-select current pulse 38 may be terminated. In the present embodiment 4 microseconds after the termination of the other partial-select pulse 37 was found to be a sufficient delay. At the termination of the pulse 38 at the time $t_{r+2}$, the core 11' is permitted a full restoration to its original saturated flux state. With this final small flux excursion in the core 11' a small current will again be generated in the drive line 16'. This current, which is indicated in FIG. 4 by the negative-going peak 41, is also insufficient to cause any permanent flux change in the high coercive force tape of the address segments of the interrogated word row. Shortly after the time $t_{r+2}$ the word row defined by the drive line 16' is again in readiness for a write or a read operation.

It is clear from the foregoing description of an illustrative write and read operation in accordance with the principles of this invention that the read operation has been nondestructive. This nondestructive character of the read operation is achieved by the novel cooperation of the partial-select coincident current pulses 37 and 38 in conjunction with the continuously applied biasing current 30. It will be appreciated that other current ratios than the exemplary ones assumed for the read pulses 37 and 38 may be employed to achieve full flux switching in the low coercive force tapes of the address segments of the memory elements 17 during the positive half-cycle of the drive current 40 and still fall short of the magnetomotive drive necessary to switch flux in the high coercive force tapes during the negative half-cycle of the current 40.

What have been described are considered to be only illustrative methods and apparatus according to the principles of this invention. It is to be understood that various and numerous other arrangements may be devised by one skilled in the art without departing from the spirit and scope of this invention.

What is claimed is:

1. A magnetic memory circuit comprising a first conductor having a first and a second magnetic tape helically wound therearound, each of said tapes having substantially rectangular hysteresis characteristics, said first tape having a coercive force higher than that of said second tape, a second conductor inductively coupled to both said first and said second tapes, and means for applying a current during a write operation to said second conductor for switching a magnetic state in said first tape and for applying a read current to said second conductor during a read operation sufficient only to switch a magnetic state in said second tape comprising a magnetic core coupled to said second conductor, a first and a second select winding and a bias winding coupled to said core, means including a first current source for applying a constant bias current of one polarity of said bias winding, means including a second current source for applying a first current pulse of the opposite polarity of one amplitude to said first select conductor for a predetermined duration for both said write and said read operations, and means including a controllable third current source for applying to said second select conductor a second current pulse of said opposite polarity and of said one amplitude for said predetermined duration for said write operation and for applying to said second select conductor a third current pulse of said opposite polarity of an amplitude less than said one amplitude and for a duration longer than said predetermined duration.

2. An access switch for generating different amplitude access currents for a magnetic memory comprising rows and columns of magnetic cores, a first and a second plurality of selection conductors threading said rows and columns of magnetic cores, respectviely, a biasing conductor threading each of said cores, an output winding coupled to each of said cores, said output winding comprising a drive line for an information row of said memory, a bias current source connected to said biasing conductor for applying a continuous current of one polarity thereto for maintaining each of said cores in one state of magnetic saturation, first current source means for selectively applying first current pulses of one amplitude and duration and of the opposite polarity to said first selection conductors for each operative phase of said memory, and second current source means energized coincidenty with said first current source means for selectively applying second current pulses of said one amplitude and duration and of said opposite polarity to said second selection conductors for one operative phase of said memory and for selectively applying third current pulses of an amplitude less than said one amplitude and longer than said one duration of said opposite polarity to said second selection conductors for another operative phase of said memory.

3. An access switch according to claim 2 in which said third current pulses have substantially half the amplitude and substantially twice the duration of said second current pulses and said second current pulses are equal in absolute amplitude to said bias current.

4. A magnetic memory circuit comprising a first conductor having a first and a second magnetic tape helically wound therearound, each of said tapes having substantially rectangular hysteresis characteristics, said first tape having a coercive force higher than that of said second tape, a second conductor inductively coupled to both said first and said second tapes, means for writing an information bit in said memory circuit comprising a magnetic core coupled to said second conductor, a first and a second select winding and a bias winding coupled to said core, means including a bias current source for applying a constant bias current of one polarity to said bias winding, means including a first current source for applying a first current pulse of the opposite polarity to said first select conductor, means including a second current source for applying a second current pulse of said opposite polarity to said second select conductor coincidently with said first current pulse, and means for applying a bit current pulse to said first conductor of a polarity corresponding to the binary value of said information bit coincidently with said first and second current pulses; and means for reading information out of said memory circuit comprising means also including said first current source for again applying said first current pulse to said first select conductor, and means including a third current source for applying a third current pulse of said opposite polarity and of an amplitude less than said first current pulse to said second select conductor for a duration longer than said last-mentioned pulse.

5. An electrical circuit for generating in a first operative phase a bipolar signal of one amplitude and in a second operative phase a bipolar signal of a lesser amplitude comprising a magnetic core having a first and a second select winding, a biasing winding, and an output winding thereon, means for applying a partial-select current pulse of one polarity and amplitude and for a predetermined duration to said first select winding during each of said operative phases, means for applying a partial-select current pulse of said one polarity and amplitude and for said predetermined duration to said second select winding during said first operative phase, means for applying a partial-select current pulse of said one polarity but of an amplitude less than said one amplitude and for duration longer than said predetermined duration to said second select winding during said second operative phase, and means for applying a biasing current of said one amplitude but of the opposite polarity to said biasing winding during each of said operative phases.

6. An electrical circuit for selectively generating at a plurality of output points in a first operative phase a bipolar signal of one amplitude and in a second operative phase a bipolar signal of a lesser amplitude comprising a plurality of magnetic cores arranged in rows and columns, a plurality of first select conductors threading respectively the cores of said rows, a plurality of second select conductors threading respectively the cores of said columns, a biasing conductor threading each of said cores, an output winding for each of said cores at said output points, respectively, means for selectively applying a partial-select current pulse of one polarity and amplitude and for a predetermined duration to one of said first select conductors during each of said operative phases, means for selectively applying a partial-select current pulse of said one polarity and amplitude and for said predetermined duration to one of said second select conductors during said first operative phase, means for applying a partial-select current pulse of said one polarity but of an amplitude less than said one amplitude and for a duration longer than said predetermined duration to one of said second select conductors during said second operative phase, and means for applying a biasing current of said one amplitude but of a polarity opposite to that of said one polarity to said biasing conductor during each of said operative phases.

7. An access switch for generating bipolar drive signals of different amplitudes during different operative phases comprising rows and columns of magnetic cores, a first and a second plurality of selection conductors threading the cores of said rows and columns of cores, respectively, means for continuously biasing each of said cores in equal first directions of magnetic saturation, an output winding on each of said cores, means for applying equal first coincident selection current pulses to a selected one of each of said first and second plurality of selection conductors to switch the core defined thereby to the opposite direction of magnetic saturation for generating a first half-cycle output signal of one polarity on its output winding during one operative phase, said biasing means returning said defined core to said one direction of magnetic saturation at the termination of said coincident pulses to generate a second half-cycle output signal on its output winding of the opposite polarity, means for applying during a subsequent operative phase unequal second coincident selection current pulses to said selected one of each of said first and second plurality of selection conductors to switch said defined core to said opposite direction of magnetic saturation for generating a first half-cycle output signal of said one polarity but of an amplitude less than the first half-cycle output signal generated during said one operative phase, and means for limiting the second half-cycle output signal during said subsequent operative phase comprising means for extending the lesser of said unequal second coincident selection current pulses beyond the time duration of said second half-cycle.

8. An access switch for generating bipolar drive signals of different amplitudes during different operative phases comprising a magnetic core having an output winding thereon, means for applying a switching magnetomotive force to said core during a first operative phase to generate a first half-cycle output current of one polarity in said output winding, means for continuously magnetically biasing said core in the opposite direction to switch said core in said opposite direction during said first operative phase to generate a second half-cycle output current in said output winding of the opposite polarity, and means for generating first and second half-cycle output currents in said output winding during a second operative phase of amplitudes less than said corresponding signals generated during said first operative phase comprising selection winding means coupled to said core and means for applying a sum selection current to said winding means during said first half-cycle sufficient to generate a magnetomotive force less than said magnetomotive force applied to said core during said first operative phase and for applying a sum selection current to said winding means during said second half-cycle sufficient to generate a magnetomotive force partially to oppose said continuous magnetic biasing of said core.

References Cited

UNITED STATES PATENTS

| | | | |
|---|---|---|---|
| 2,691,155 | 10/1954 | Rosenberg et al. | 340—174 |
| 2,734,187 | 2/1956 | Rajchman | 340—174 |
| 2,768,367 | 10/1956 | Rajchman | 340—174 |
| 2,776,419 | 1/1957 | Rajchman et al. | 340—174 |
| 3,296,600 | 1/1967 | Einsele | 340—174 |

OTHER REFERENCES

Session on Square-Loop Applications, Convention on Ferrites, "A Magnetic-Core Matrix Store with Direct Selection Using a Magnetic-Core Switch Matrix" by Renwick, October 1956; pages 436–444.

1960 International Solid-State Circuits Conference, Session V: "Information Storage Techniques," by Carter et al.; Feb. 11, 1960; pages 54 and 55.

IBM Technical Disclosure Bulletin "Matrix Store with Short Reset Time" by W. A. Christopherson; vol. 5, March 1963 page 90.

Computer Design, "New Mass Core Memory" June 1963, pages 40–42.

BERNARD KONICK, *Primary Examiner.*

S. URYNOWICZ, *Assistant Examiner.*